No. 670,444. Patented Mar. 26, 1901.
T. WINSHIP.
VALVE FOR ENGINES.
(Application filed Mar. 29, 1900.)
(No Model.) 2 Sheets—Sheet 1.

Witnesses.
R. A. Balderson
C. L. Vaughn

Inventor.
Thomas Winship,
by F. E. Stebbins,
Attorney.

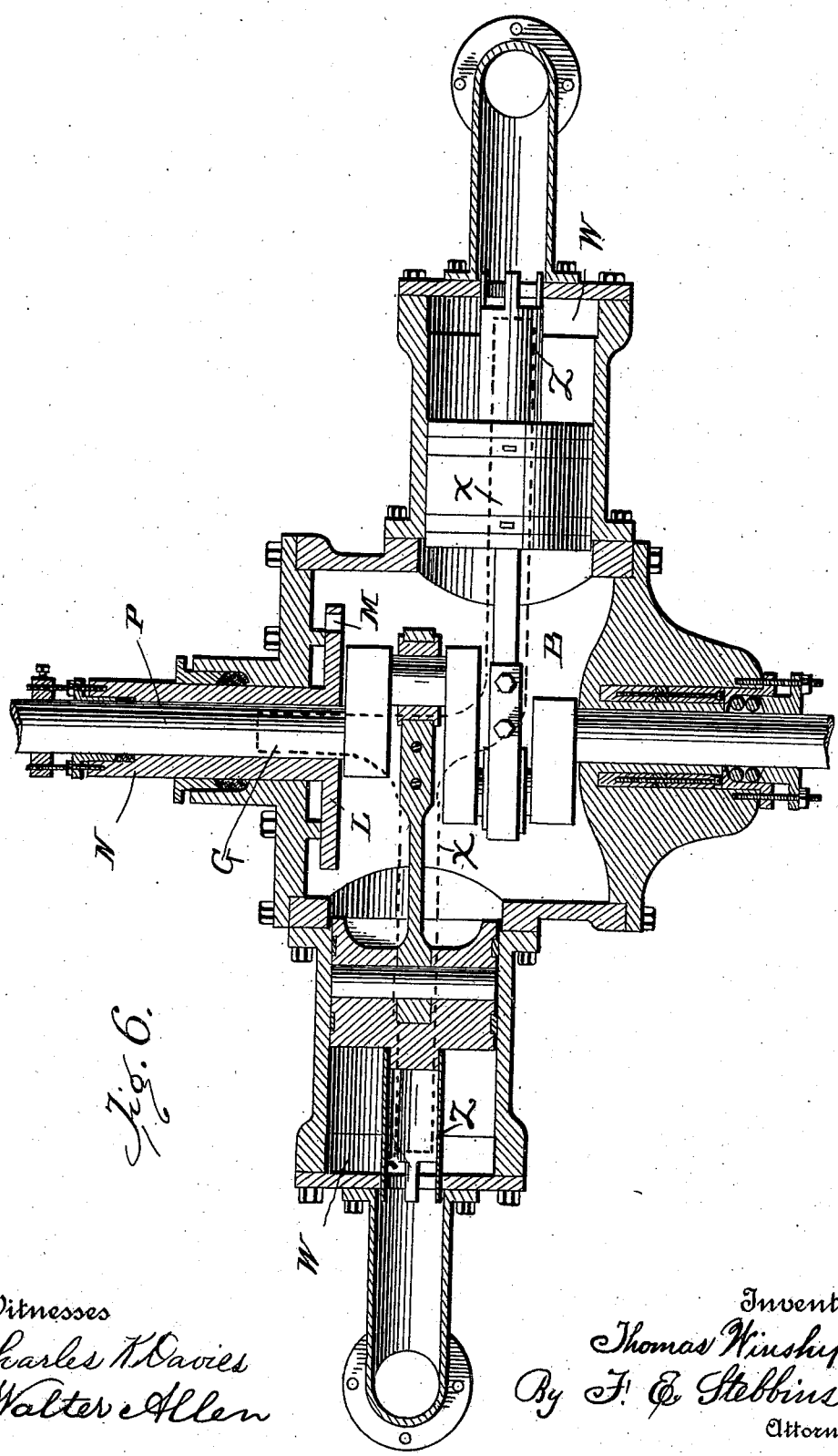

UNITED STATES PATENT OFFICE.

THOMAS WINSHIP, OF TOLEDO, OHIO, ASSIGNOR TO THE TOLEDO STEAM AND AIR MOTOR COMPANY.

VALVE FOR ENGINES.

SPECIFICATION forming part of Letters Patent No. 670,444, dated March 26, 1901.

Application filed March 29, 1900. Serial No. 10,718. (No model.)

*To all whom it may concern:*

Be it known that I, THOMAS WINSHIP, a citizen of the United States, residing at Toledo, in the county of Lucas and State of Ohio, have invented a certain new and useful Improvement in Valves for Engines, of which the following is a specification.

The object of my invention is the production of a valve for controlling the admission or exhaustion of motive fluid to or from a chamber of an engine, or both its admission and exhaustion, the same being adapted for use in connection with the engine which forms the subject-matter of application for Letters Patent filed by Stark and Winship on March 29, 1900, Serial No. 10,654, said valve to be simple in construction, easily renewed at small cost should it become worn, and adapted at all times to closely fit its seat, which shall be so fashioned that it can be adjusted both about and longitudinally of the shaft, and which withal shall possess other desirable features and characteristics, suiting it for perfectly performing its required functions.

With the above end in view my invention consists in certain novelties of construction and combination, and arrangements of parts hereinafter set forth and claimed.

The accompanying drawings illustrate a complete example of the physical embodiment of the invention and a modification of the valve-seat constructed according to the best of the several modes I have so far devised for the application of the principle.

Figure 1:
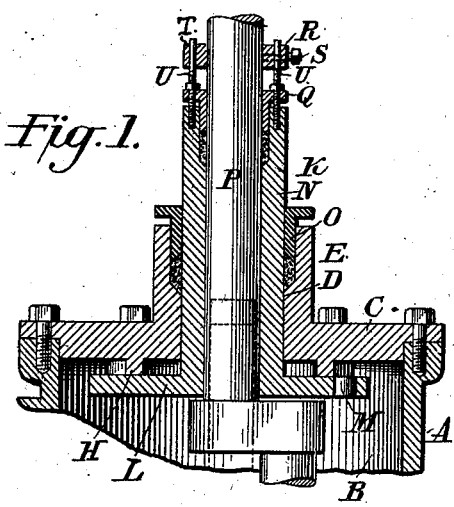
Figure 2:
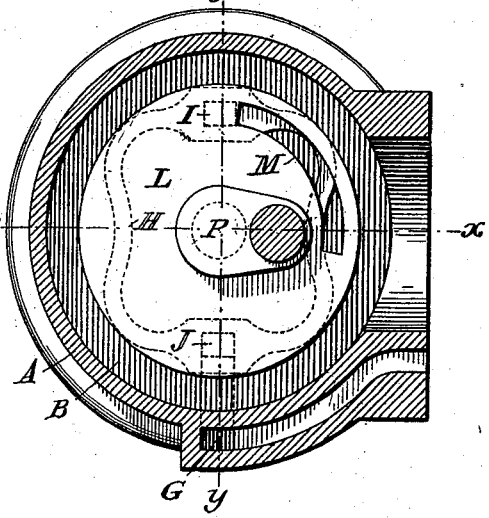
Figure 3:
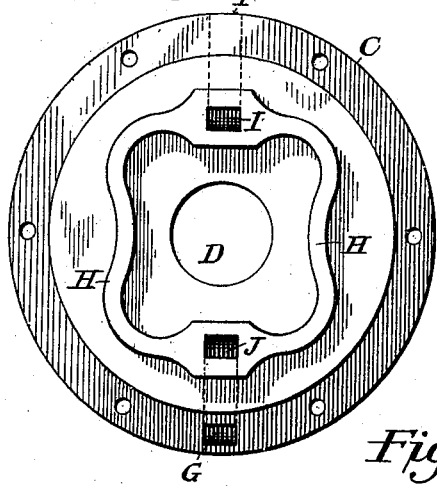
Figure 4:
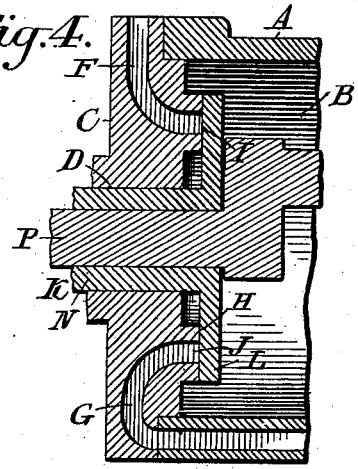
Figure 5:
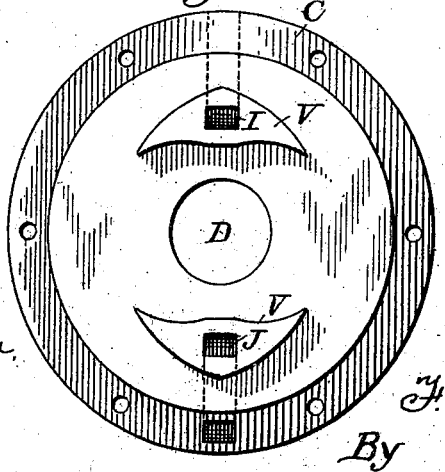

Figure 1 is a fragmentary sectional view of an engine, taken on line $x\ x$ of Fig. 2 and parallel with the engine-shaft. Fig. 2 is a sectional view in elevation, taken through the inclosed chamber of the engine. Fig. 3 is a view of the engine-head shown in Fig. 2 with the shaft and valve removed. Fig. 4 is a perpendicular section of Fig. 2, taken on line $y\ y$ and through the crank-shaft. Fig. 5 is an illustration of a modified form of valve-seat. Fig. 6 is a horizontal sectional view of an engine with which the valve is adapted to be used, the dotted lines indicating the passages from the central chamber to the end chambers.

Referring to the several figures, the letter A designates the main casting of an engine which, in connection with other elements, forms an inclosed central chamber.

B is the inclosed chamber, in this instance having the crank or cranks located therein.

C is the detachable head or side casting of the engine.

D is a central opening in the head.

E is a bearing; F, a steam-inlet passage at the top; G, a steam-eduction passage at the bottom; H, a tortuous boss on the head constituting a valve-seat; I, a port through the boss at the top; J, a port through the boss at the bottom; K, a valve; L, the disk portion of the valve; M, a slot in the disk; N, a sleeve, in this case integral with the disk; O, a packing-gland located between the bearing E and the sleeve of the valve; P, a crank-shaft having the crank located in the engine-chamber; Q, a packing-gland between the shaft and sleeve; R, a collar adjustable on the shaft; S, a set-screw.

T represents holes in the collar, and U represents pins that serve to adjust the gland Q relative to the shaft and sleeve and the free ends of which are located loosely in the holes T of the collar.

In Fig. 5, V V designate bosses on the face of the head of the engine, through which are ports for the admission and exhaustion of motive fluid.

In Fig. 6 the letters W W designate the end chambers of the engine to which motive fluid is educted from the central chamber B by way of the port J, eduction-passage G, and the branch passages X X. The steam is exhausted from the end chambers by the exhaust-valves Z Z, which are operated by the pistons.

It will be observed that the valve-sleeve loosely fits the shaft, that it can be adjusted about the shaft by means of the collar and set-screw, and that the pins loosely engage the holes in the collar whereby the sleeve can move longitudinally on the shaft and compensate for expansion and contraction, and thus always allow the disk to seat freely and maintain a close frictional contact of the said disk with the surface of the tortuous boss. The particular form of the boss or valve-seat in outline has been devised for the purpose of securing a small area of bearing-surface, and also to allow motive fluid to pass by way of the slot in the disk back of the same, and thus balance it.

In Fig. 5 are shown two separate seats for the valve-disk with ports through the same. In practice the thickness of each boss may be greatest adjacent the ports and gradually diminish toward the ends.

The *modus operandi* is as follows: The shaft being rotated until the slot in the disk comes opposite the port I, live motive fluid will be admitted by way of steam-inlet passage F and, acting on a piston or pistons, will revolve the shaft, which revolution will carry the slot beyond the port and close the same. A further revolution of the shaft will bring the slot opposite the port J and allow the motive fluid to pass from the chamber B to the end chambers W W by way of the passage G and the two branch passages X X. (Shown by dotted lines in Fig. 6.) When the pistons move inwardly, the exhaust-valves are opened and steam escapes from the chambers W W to the atmosphere. During each revolution of the disk motive fluid is admitted, educted, and exhausted.

It is obvious that my improved valve may be embodied with an engine having one or two pistons.

While I have illustrated and specifically described only one example of the physical embodiment of my invention and one modification of the valve-seat, I do not thereby intend to limit the same to such example and modification, inasmuch as the invention may be embodied in other forms and by other modes. Parts thereof may be omitted—such, for example, as one of the passages and one of the ports—in which case additional means can be employed to admit or exhaust motive fluid to or from the inclosed chamber. There may also be substituted different means for adjusting the valve-sleeve upon the shaft, and many other alterations in construction introduced without constituting a substantial departure.

What I claim is—

1. The combination in an engine, of a head or casting having a motive-fluid passage and a valve-seat provided with a port for admitting live motive fluid to the crank-chamber; a valve comprising a disk and an adjustable sleeve; and a crank-shaft; in substance as set forth.

2. The combination in an engine, of a head or casting having a motive-fluid passage and a valve-seat provided with a port for admitting live motive fluid to the crank-chamber; a valve comprising a disk and an adjustable sleeve; and a crank-shaft; said disk being slotted or cut away so as to uncover the port during a part of its revolution.

3. The combination in an engine, of a head or casting having a motive-fluid passage and a valve-seat provided with a port for admitting live motive fluid to the crank-chamber; a valve comprising a disk and a sleeve; and a crank-shaft; said sleeve being adjustable about the shaft.

4. The combination in an engine, of a head or casting having a motive-fluid passage and a valve-seat provided with a port for admitting live motive fluid to the crank-chamber; a valve comprising a disk and a sleeve; and a crank-shaft; said sleeve being adjustable longitudinally of the shaft.

5. The combination in an engine, of a head or casting having a motive-fluid passage and a valve-seat provided with a port; a valve comprising a disk and a sleeve; and a crank-shaft upon which the sleeve is located; said valve-seat being in relief or in the form of a boss.

6. The combination in an engine, of a head or casting having a motive-fluid passage and a valve-seat provided with a port; a valve comprising a disk and a sleeve; and a crank-shaft; said valve-seat being in the form of a tortuous boss.

7. The combination in an engine, of a head or casting having motive-fluid inlet and exhaust passages and a valve-seat provided with ports each communicating with the crank-chamber; a valve comprising a disk and a sleeve; and a crank-shaft; said disk cut away or slotted so as to uncover the ports successively during parts of its revolution.

8. The combination in an engine, of a head or casting having motive-fluid inlet and exhaust passages and a valve-seat provided with ports each communicating with the crank-chamber; a valve comprising a disk and a sleeve; and a crank-shaft; said sleeve being adjustable upon the shaft.

9. The combination in an engine, of a head or casting having motive-fluid inlet and exhaust passages and a valve-seat provided with ports; a valve comprising a disk and a sleeve; and a crank-shaft; said valve-seat being in relief or in the form of a boss.

10. The combination in an engine, of a head or casting having motive-fluid inlet and exhaust passages and a valve-seat provided with ports each communicating with the crank-chamber; a valve comprising a disk and a sleeve; and a crank-shaft; the ports through the said valve seat or seats being located approximately one hundred and eighty degrees apart.

11. The combination in an engine, of a head or casting having a bearing for a shaft; a closed crank-chamber; a valve embracing a disk cut away or slotted; a passage communicating with the closed chamber; and a seat for the valve; said disk being operated by the shaft and controlling the passage to the closed crank-chamber.

In testimony whereof I affix my signature in presence of two witnesses.

THOMAS WINSHIP.

Witnesses:
  O. P. BOWMAN,
  ELI A. STARK.